(12) United States Patent
Oberheim (10) Patent No.: US 7,849,774 B2
(45) Date of Patent: Dec. 14, 2010

(54) POWER MITER SAW HAVING DIGITAL DISPLAYS

(75) Inventor: Stephen C. Oberheim, Des Plaines, IL (US)

(73) Assignee: Roberts Bosch GmbH, Stuttgart (DE)

( * ) Notice: Subject to any disclaimer, the term of this patent is extended or adjusted under 35 U.S.C. 154(b) by 1064 days.

(21) Appl. No.: 11/108,024

(22) Filed: Apr. 15, 2005

(65) Prior Publication Data

US 2006/0230902 A1    Oct. 19, 2006

(51) Int. Cl.
B23D 45/04    (2006.01)

(52) U.S. Cl. .................. 83/471.3; 83/473; 83/490; 83/522.17

(58) Field of Classification Search ........... 83/471.3, 83/473, 490, 581, 522.17
See application file for complete search history.

(56) References Cited

U.S. PATENT DOCUMENTS

| 4,641,557 | A | 2/1987 | Steiner et al. | |
|---|---|---|---|---|
| 4,754,276 | A | 6/1988 | Carlson et al. | |
| 5,249,496 | A | 10/1993 | Hirsch et al. | |
| 5,870,939 | A * | 2/1999 | Matsubara | 83/471.3 |
| 6,776,076 | B2 | 8/2004 | Salazar | |
| 7,039,548 | B2 * | 5/2006 | Takano et al. | 702/151 |
| 2001/0000856 | A1 | 5/2001 | O'Banion | |
| 2005/0076760 | A1 | 4/2005 | Takano et al. | |
| 2005/0155477 | A1 | 7/2005 | Ozawa et al. | |
| 2005/0247177 | A1 * | 11/2005 | Hetcher et al. | 83/471.3 |
| 2005/0247178 | A1 * | 11/2005 | Hetcher et al. | 83/581 |
| 2005/0262978 | A1 * | 12/2005 | Hetcher et al. | 83/100 |
| 2005/0262983 | A1 * | 12/2005 | Hetcher et al. | 83/471.3 |
| 2005/0262984 | A1 * | 12/2005 | Hetcher et al. | 83/471.3 |
| 2006/0000330 | A1 | 1/2006 | Terashima et al. | |
| 2006/0101970 | A1 * | 5/2006 | Garcia et al. | 83/581 |
| 2006/0149497 | A1 * | 7/2006 | Takano et al. | 702/151 |
| 2006/0162523 | A1 * | 7/2006 | Hetcher et al. | 83/471.3 |
| 2006/0266184 | A1 * | 11/2006 | Hetcher et al. | 83/471.3 |

FOREIGN PATENT DOCUMENTS

EP    1522363    4/2005
JP    2000254817    9/2000

OTHER PUBLICATIONS

Sears/Craftsman Digital Display, Troubleshooting and Parts Lists for Craftsman 10 "Electronic Radial Saw Model Nos. 113.198211 and 113.198251, pp. 39-44, 78-79, 84-89 and 94-95.

* cited by examiner

*Primary Examiner*—Kenneth E. Peterson
(74) *Attorney, Agent, or Firm*—Greer, Burns & Crain, Ltd.

(57) ABSTRACT

Embodiments are directed to a power compound miter saw having miter angle as well as bevel angle adjustment capabilities, with sensing units that can measure the angular position of the miter table relative to the base as well as the bevel angle of the blade relative to the table. Such sensing units generate position signals that can be used to provide a digital display of the miter and bevel angles to a high degree of accuracy. Moreover, the embodiments utilize mechanisms which enable a user to tighten the pivot connections of the table and the base as well as the pivot connection between the table and the bevel pivot support housing without damaging the sensing units. The sensing units are configured and mounted in such a way as to not interfere with access to the nut which can be rotated to vary the amount of friction between the adjacent components.

27 Claims, 11 Drawing Sheets

POWER MITER SAW HAVING DIGITAL DISPLAYS

BACKGROUND OF THE INVENTION

The present invention relates to power tools.

Power miter saws that are used by trim carpenters, artisans and woodworkers are becoming ever more sophisticated as a result of continuing research and development efforts on the part of commercial manufacturers. Relatively recent developments include compound miter saws having extremely large blades that can cut miter and bevel angles on large pieces of stock, such as relatively wide crown and other types of molding. Still more recent developments include sliding compound miter saws which have a blade and engine assembly which can slide on rails toward the user after engaging the work piece, which enables large size stock to be cut at various miter and bevel angles using the well known conventionally sized smaller blades. Such sliding compound miter saws are extremely useful and convenient for performing accurate cuts on large sized trim pieces and other stock, particularly in the home building business sector.

Regardless of whether sliding compound or regular miter saws are used, the more recent compound miter saw designs typically include detents for common settings that are required for miter angles for various types of trim and other carpentry work. Specific bevel and miter angles are commonly used for cutting trim pieces for inside and outside corners in either a vertical or horizontal orientation, as well as to cut trim pieces for inside and outside corners of crown molding, for example.

It is also known by experienced and competent artisans that small variations in the resulting angles of a 90° inside or outside corners can occur during construction, which require some angular compensation in order for the trim pieces to mate in a tight seam. This is usually effectively accomplished only by those individuals who have solid knowledge and experience. Such knowledgeable artisans may often wish to adjust either a miter angle or a bevel angle or both to produce a desirable result and such adjustments may be less than a single degree from the known or expected angles. While conventional miter saws typically have such angular markings for setting miter as well as bevel angles, it is not always easy to lock in desired settings or to accurately differentiate such small angles.

SUMMARY OF THE INVENTION

Embodiments of the present invention are directed to a power compound miter saw having miter angle as well as bevel angle adjustment capabilities, with sensing units that can measure the angular position of the miter table relative to the base as well as the bevel angle of the blade relative to the table. Such sensing units generate position signals that can be used to provide a digital display of the miter and bevel angles to a high degree of accuracy. Moreover, the embodiments utilize mechanisms which enable a user to tighten the pivot connections of the table and the base as well as the pivot connection between the table and the bevel pivot support housing without damaging the sensing units. The sensing units are configured and mounted in such a way as to not interfere with access to the nut which can be rotated to vary the amount of friction between the adjacent components.

DETAILED DESCRIPTION

The preferred embodiment of the present invention is shown in FIGS. 1-9 of the drawings and comprises a power sliding compound miter saw that has the capability of adjusting both the miter and bevel angles. It should be understood that the present invention may also be implemented in a miter saw that does not have the compound sliding capability. For that matter, the sensing unit structure may be useful in other applications where the angular position of one component relative to another is to be determined and where the two components may be required to be tightened relative to one another by the use of a nut on a shaft, which thereby necessitates the ability of the sensing unit to be axially moved along a shaft. The two sensing unit structures that will be illustrated and described herein are not identical to one another, but share some functional commonality. The differences between the bevel and miter sensing unit structures may lend themselves to be used for different applications. Both sensing unit structures can produce highly accurate measurements of the miter and bevel angles, i.e., to at least 0.1 degrees which are displayed on a digital display located on the miter saw.

Figure 1:
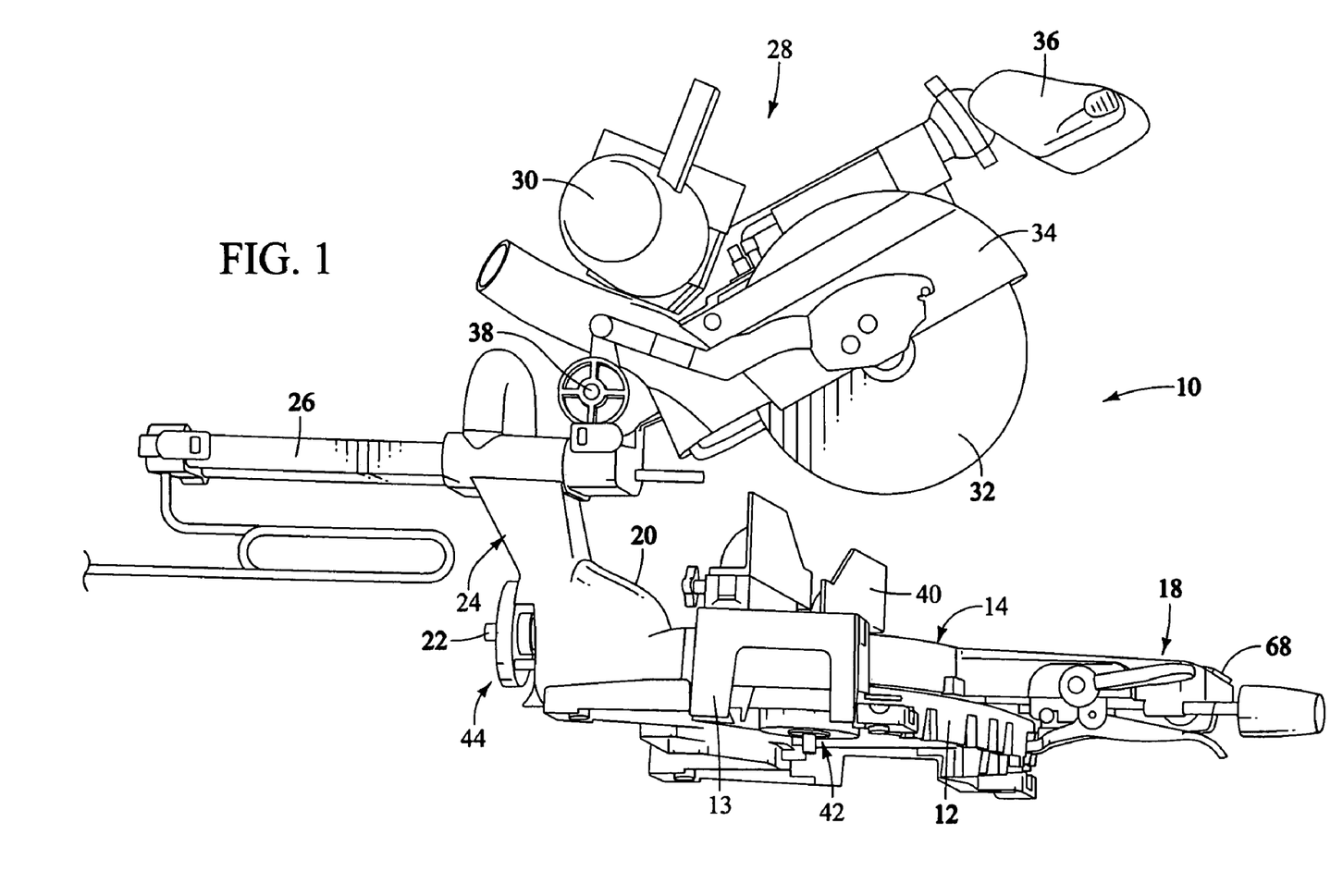
FIG. 1 is a perspective view from a lower left side of a compound miter saw embodying the present invention.
Figure 2:
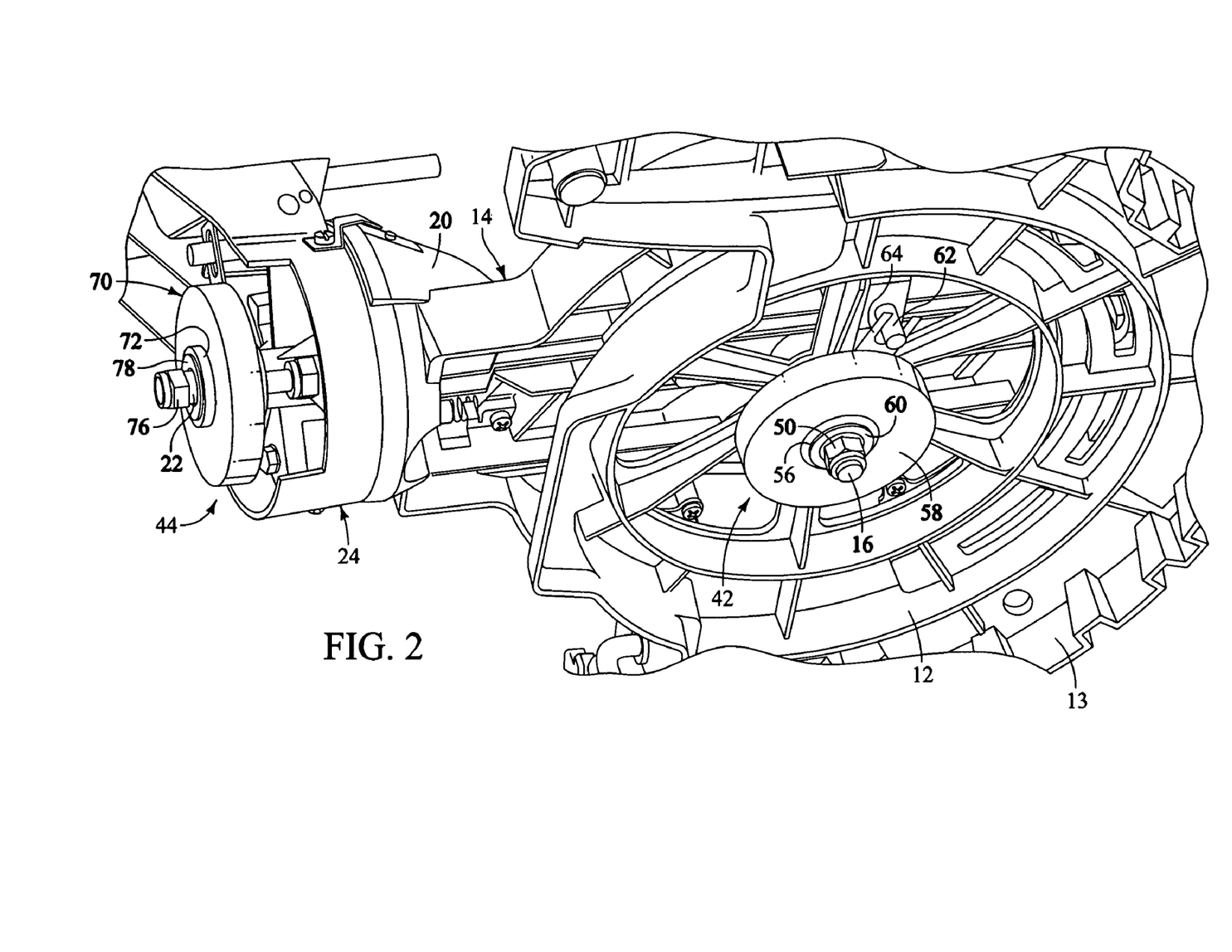
FIG. 2 is a perspective view from beneath the left side of a portion of the apparatus shown in FIG. 1.

Turning now to FIGS. 1 and 2, a compound miter saw indicated generally at 10, is shown in perspective and includes a saw base 12 that is preferably generally circular in its overall shape and which has downwardly extending legs 13 for supporting the saw on a surface. The saw 10 has a rotatable table, indicated generally at 14, which pivots around a central generally vertical shaft 16. The table 14 can be positioned at different bevel angles by using a handle assembly, indicated generally at 18, that preferably includes a detent and release mechanism as well as a locking mechanism for setting the bevel angle of the saw. The detent and release mechanism and the locking mechanism are not in and of themselves a necessary part of the present invention except insofar as some type of such mechanisms are required for such a compound miter saw 10.

The table 14 includes a bevel base portion 20 located at the rear thereof and has a generally horizontal shaft 22 that defines the horizontal axis for adjusting the bevel angle. The shaft 22 supports a bevel pivot support housing, indicated generally at 24, that pivots relative to the bevel base portion 20. The bevel pivot support housing 24 has openings in which a slideable carriage 26 is located with the carriage 26 supporting a saw blade and motor assembly, indicated generally at 28. The blade and motor assembly 28 has a motor 30, a saw blade 32, a guard structure 34 and a handle 36. The blade and motor assembly also pivots about a shaft 38 for bringing the saw blade downwardly into a cutting position. The saw 10 has a fence 40 that is operatively connected to the base 12 for holding a work piece (not shown) in position to be cut.

The miter angle is measured by a miter angle sensing structure, indicated generally at 42, and the bevel angle is measured by a bevel angle sensing structure, indicated generally at 44. With regard to the miter angle sensing unit structure 42, and referring particularly to FIGS. 2, 3 and 4, the table 14 is carried by the base 12 and the table 14 is rotatable about the shaft 16 which is tightly secured to the table by bolts 46 that are preferably screwed into threaded apertures of the base 12. The shaft 16 extends through the base 12 which is preferably an aluminum die casting and has a flat annular boss 48 formed therein. The shaft 16 also extends through the base 12 and has a threaded end portion which a threaded nut 50 is applied screwed onto. The nut 50 controls the amount of friction that exists between the table 14 and the base 12 so that when it is tightened, it is more difficult to rotate the table relative to the base.

Figure 3:
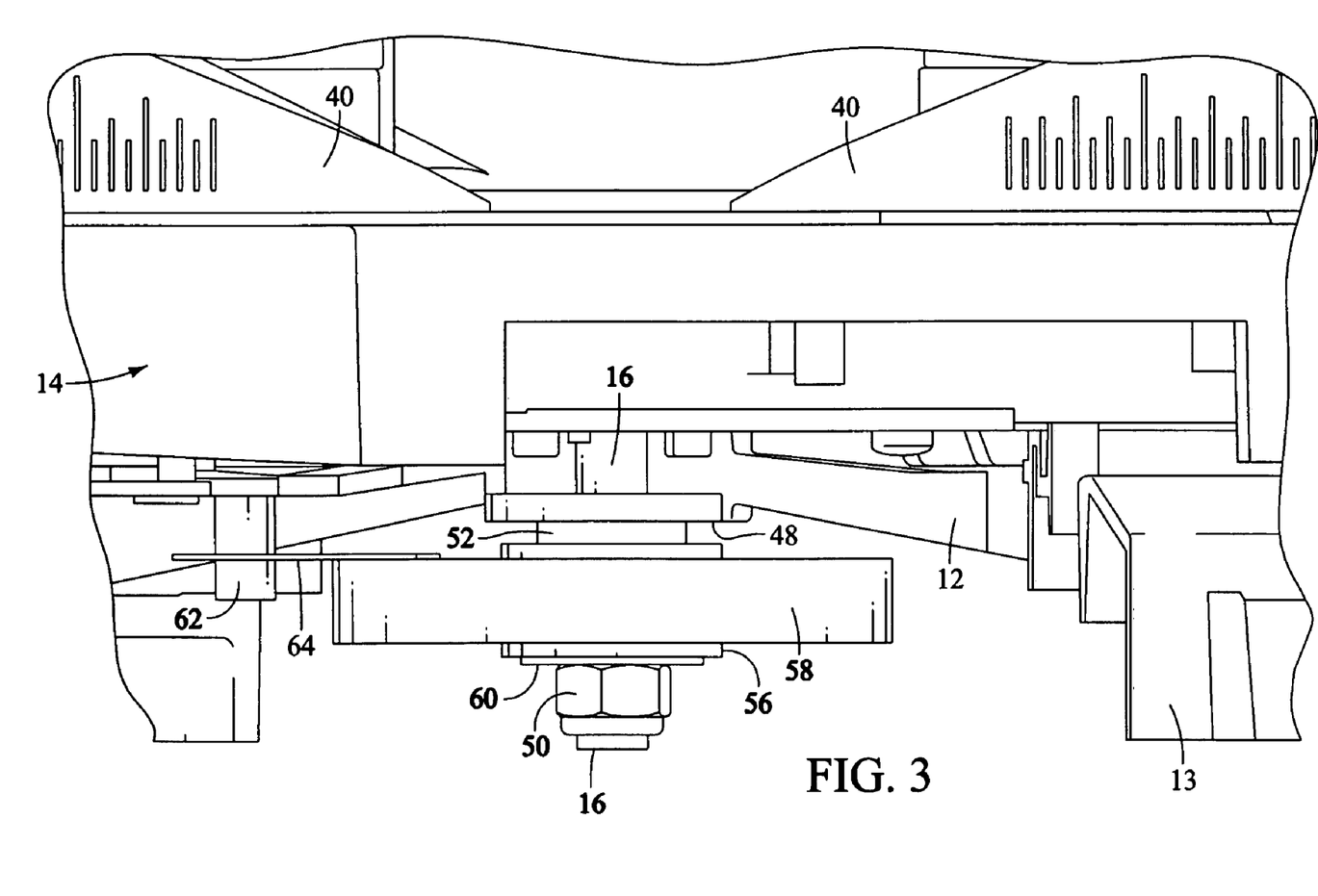
FIG. 3 is an enlarged side view of the miter angle sensor structure of the embodiment shown in FIG. 1.
Figure 4:
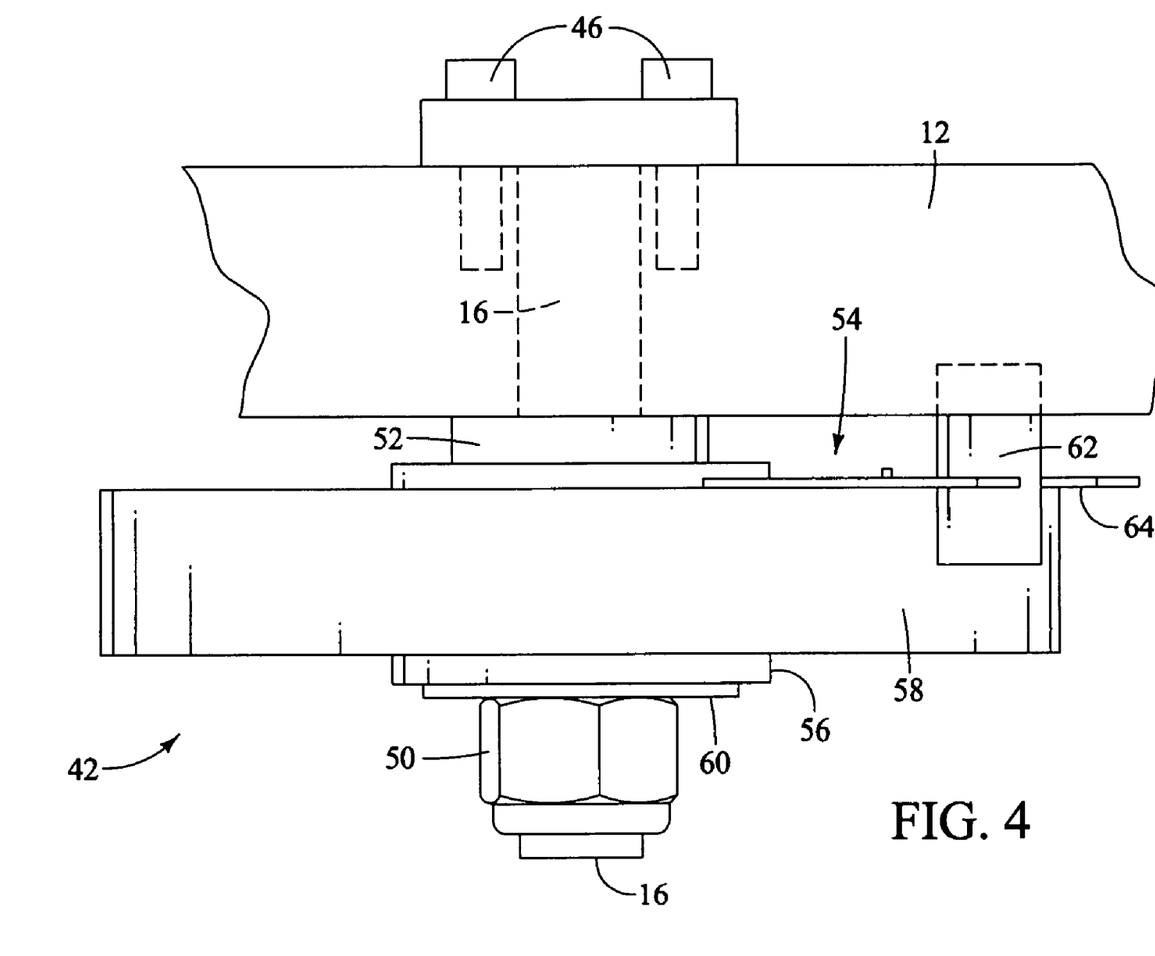
FIG. 4 is another enlarged section of a portion of the miter angle sensor structure shown without the base or table of the embodiment shown in FIG. 1.

It should be understood that over the life of the saw 10, it may be necessary to tighten the nut 50 because of normal wear to maintain the desired amount of friction between the base 12 and the table 14. The sensing structure 42 is located between the base casting 12 and the nut 50 and comprises a thrust bearing 52, an angular position transducer, indicated generally at 54, which has an inner hollow cylinder 56, an outer cylindrical housing 58 and an anti-rotation keyed washer 60, which is located on the shaft 16 between the hollow cylinder 56 and the nut 50.

Figure 5:
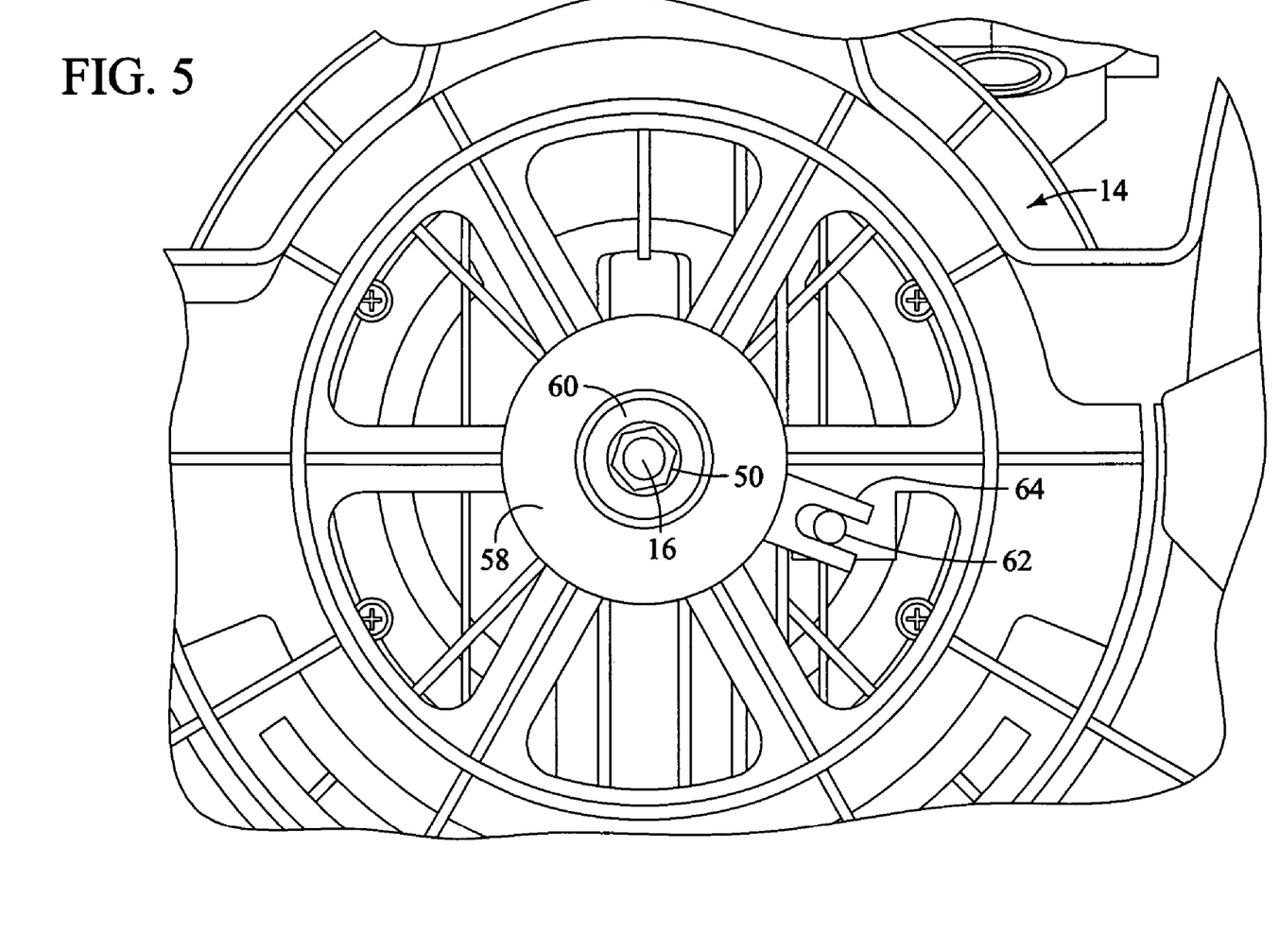
FIG. 5 is a bottom view of a portion of the embodiment shown in FIG. 1 and particularly illustrating the miter angle sensor structure.
Figure 15A:
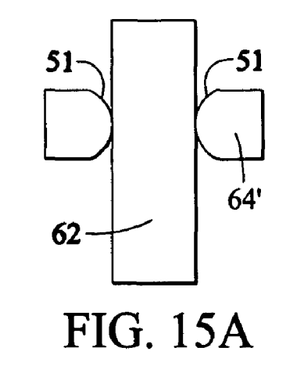
FIGS. 15A and 15B are side and top views, respectively, of an alternative embodiment of a pin and fork connection; and, FIGS. 16A and 16B are side and top views, respectively, of another alternative embodiment of a pin and fork connection.
Figure 15B:
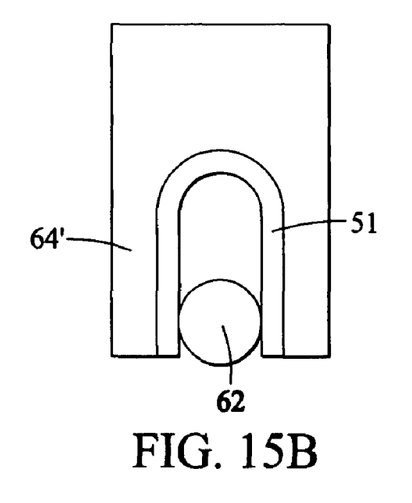
Figure 16A:
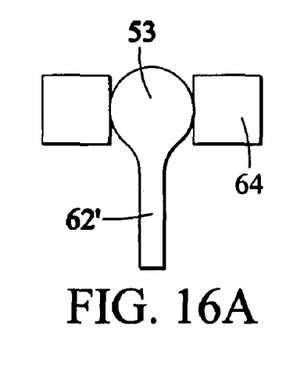
Figure 16B:
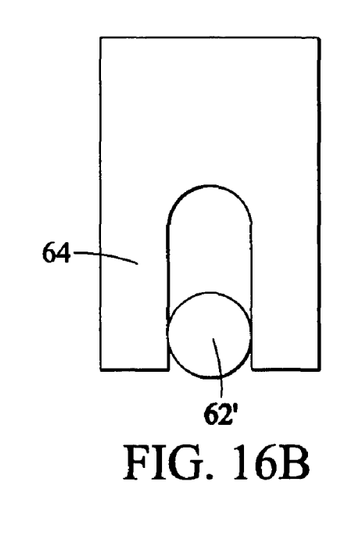

As shown in FIGS. 3, 4, and 5, an anti-rotation pin 62 is preferably press-fit into a complimentary sized and shaped opening in the base casting 12 and its axis is preferably substantially parallel to the axis of the shaft 16. An anti-rotation bracket 64 has a forked outer end portion that contacts the anti-rotation pin on opposite sides thereof and the bracket 64 is attached to the cylindrical housing 58 of the miter angular position transducer 54. Since the pin is secured to the base 12, the cylindrical housing 58 of the miter angular position transducer 54 is immobilized relative to the base 12. The inner hollow cylinder 56 is secured to the shaft 16 so that when the table is rotated relative to the base, the shaft 16 as well as the inner hollow cylinder 56 rotates relative to the cylindrical housing 58 of the miter angular position transducer and the angular position transducer 54 thereby generates signals that are indicative of the angular position of the table 14 relative to the base 12 of the saw. An alternative embodiment of the pin and fork connection is shown in FIGS. 15A and 15B where the fork of bracket 64' has curved faces 51 so that there is only point contact on opposite sides of the pin 62. Similarly, another alternative embodiment is shown in FIGS. 16A and 16B wherein the pin 62' has a smaller diameter base portion and an enlarged spherical end portion 53 that also ensures point contact on opposite sides of the spherical end portion 53 and the sides of the fork of bracket 64. Both of these embodiments allow for relative angular misalignment between the pin and the fork which may occur during the manufacture of the saw 10. However, regardless of the misalignment, there are no resulting errors because point contact on opposite sides of the pin with the fork is maintained.

Figure 14:
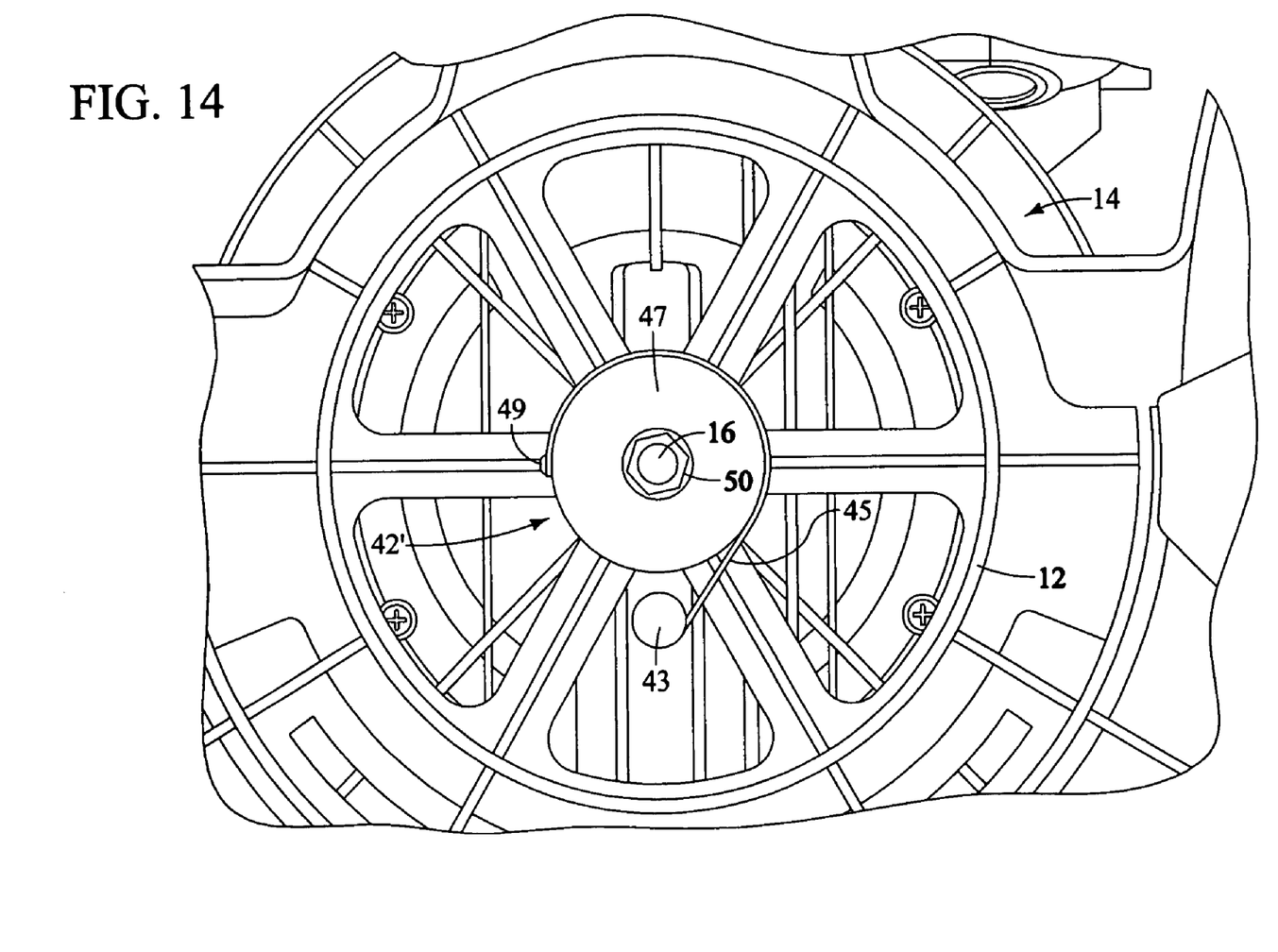
FIG. 14 is a bottom view of a portion of an alternative embodiment particularly illustrating a string potentiometer or string driven transducer implementation for determining the miter angle.

An alternative embodiment of the sensing structure 42 is shown in FIG. 14 which comprises a string potentiometer or string driven transducer 43 mounted to the base 12 which has a string or flexible wire 45 that is wound around a string guide 47 and has its outer end attached to the string guide 47 by a screw 49 or the like. As is known to those of ordinary skill in the art, the string is biased to retract the string and provides an electrical signal that is indicative of the length of the extended string. Therefore, as the string guide is rotated, electrical signals are generated that are proportional to the angular position of the table 14.

As can be appreciated from FIG. 3, when the nut 50 is tightened on the shaft 16, there will be a compressive force applied to the keyed washer 60, the hollow cylinder 56 and the thrust bearing 52 against the boss 48 of the base. As the nut is tightened, this compressive force will increase the friction of the table relative to the base and therefore increase the amount of force that is required to rotate the table relative to the base. It should also be appreciated that as the nut 50 is rotated, it will cause the miter angular position transducer 54 to move in an axial direction. Since the miter angular position transducer 54 is a unitary item, it is necessary that the inner hollow cylinder 56 and cylindrical housing 58 move in unison. While the inner hollow cylinder 56 needs to be able to move in the axial direction, it is also necessary that the cylinder 56 not have any angular movement with respect to the shaft 16 for the reason that this would result in an inaccurate angular position signal being generated by the miter angular position transducer 54.

Figure 9:
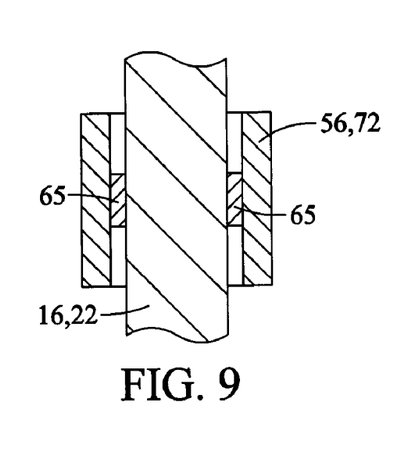
FIG. 9 is a cross section of a portion of the preferred embodiment of the miter saw and illustrating an O-ring connection between a shaft and a shaft encoder
Figure 10:
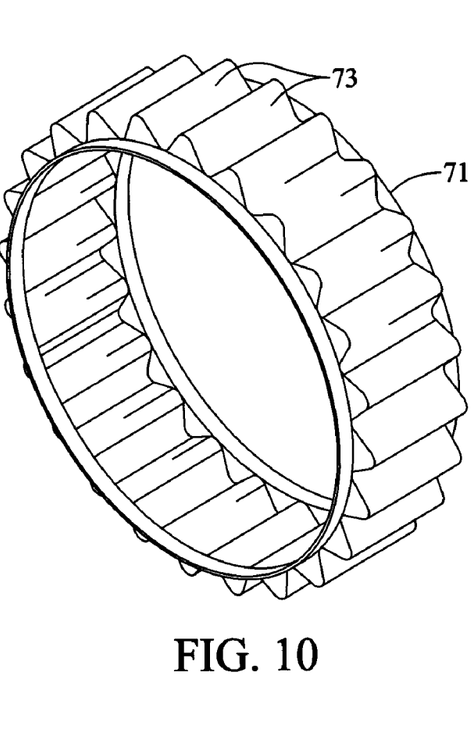
FIG. 10 is a partial perspective of a portion of an alternative embodiment of the miter saw, particularly illustrating a tolerance ring that can be used to connect a shaft and a shaft encoder.

One of several configuration or mechanisms can be used to permit axial movement while resisting relative rotational movement between the inner hollow cylinder and the shaft 16. It is preferable that a rubber or rubber-like O-ring 65 be positioned between the inside diameter of the inner hollow cylinder 56 and the shaft 16 as shown in FIG. 9. The O-ring 65 should be sized so that it is placed in sufficient compression to insure that rotation of the shaft will result in rotation of the hollow cylinder 56 but also permit the limited axial movement that is necessary as a result of the tightening of the nut 50. While the use of the O-ring 65 is preferred, a tolerance ring 71 having wave portions 73 as shown in FIG. 10 may also be employed. As is known to those skilled in the art, a tolerance ring is a precision-engineered device made from a thin spring steel strip of material into which waves, corrugations or bumps are formed. The strips are cut to length and curled into the ring shape. The waves are either facing inward or outward to accommodate different applications. For the purpose of this alternative embodiment, the waveforms are designed to preferably exert a rotational holding force while permitting axial movement.

Figure 11:
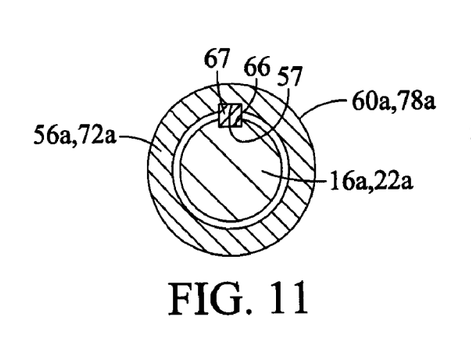
FIG. 11 is a cross section portion of an alternative embodiment of the miter saw particularly illustrating a spline or key connection of a shaft and a shaft encoder.

A key or spline arrangement may also be used as shown in FIG. 11. In this alternative embodiment, a groove 57 is cut or formed on the inside surface of the inner hollow cylinder 56a and the keyed washer 60a, and a groove 66 is cut in the outside of the shaft 16a, and a key or spline 67 is placed in the grooves to prevent relative angular movement between them while permitting axial movement of the cylinder 56a and the keyed washer 60a along the shaft 16a.

A principal consideration of these embodiments is the capability of maintaining angular nonslipping contact while permitting axial movement so that the miter angular position transducer 54 is not damaged by the axial movement of it when the nut is rotated to increase the friction between the base 12 and table 14.

Figure 12:
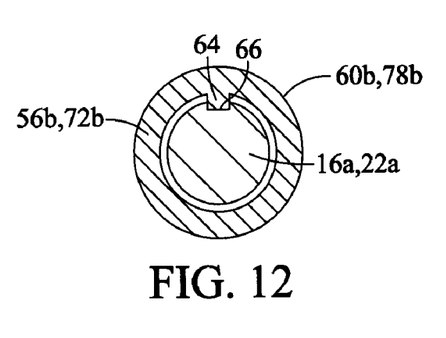
FIG. 12 is a cross section of a portion of an alternative embodiment, particularly illustrating a keyed washer and a grooved shaft.
Figure 13:
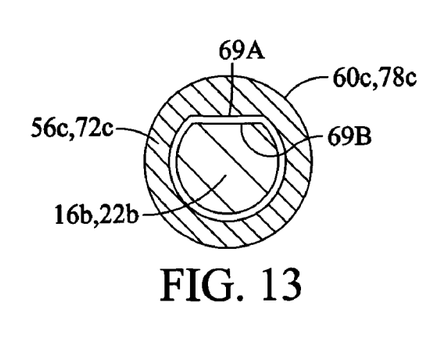
FIG. 13 is a cross section portion of an alternative embodiment of the miter saw particularly illustrating a flat surface to flat surface connection of a shaft and a shaft encoder.

It is also important that rotation of the nut relative to the shaft does not damage the miter angular position transducer, and it is for that reason that the keyed washer 60 is provided to prevent any rotating force being applied to the inner hollow cylinder 56. As shown in FIG. 12, the hollow cylinder 56b and the keyed washer 60b each has an inwardly directed tang 64 that engages the groove 66 in the shaft 16a. Another embodiment shown in FIG. 13 employs adjacent flats 69A and 69B which prevent relative rotation of the hollow cylinder 56c and the keyed washer 60c relative to the shaft 16b while permitting sliding movement. FIG. 13 shows a gap between the two components which in practice would not exist to the extent that any appreciable play would occur between these components.

The miter angular position transducer 54 is preferably a single rotation potentiometer that will actually rotate less than a full revolution as applied to the embodiment illustrated. As is typical for miter saws, the table is generally limited in its rotation from a left 45° position to a right 45° position. Thus, only approximately 90° of rotation is used to generate the angular position signals that are sent to a display unit 68 that preferably has an internal microprocessor that is configured to receive the position signals from the sensing unit 42 and thereby generate a digital display of the angular position of the table.

The user can zero the display unit 68 by putting the miter saw into a detent zero position and pressing the zero button. In this zero position, the blade 32 is preferably exactly perpendicular to the plane of the fence 40. The user can also press a store button and store the current position.

The angle display unit 68 should be mounted on the saw table near the front for easy viewing, and may conveniently be located on the handle 18. While not discussed in detail, the bevel sensing structure 44 also produces signals that result in a digital display. It is preferred that the display unit 68 be able to display both the miter angle and the bevel angle, and have a button that allows switching between viewing the miter or bevel angle. Alternatively, there could be two displays units, i.e., one mounted near the front of the saw table that would display the miter angle and another display mounted near or on the bevel pivot support housing that would display the bevel angle. The display unit(s) will preferably show two numbers for each of the bevel and miter angles. One of these numbers preferably indicates the actual angle measurement and the other number preferably indicates a stored value or a calculated value that the user can use to adjust either the miter angle or the bevel angle until the two numbers are identical.

Figure 6:
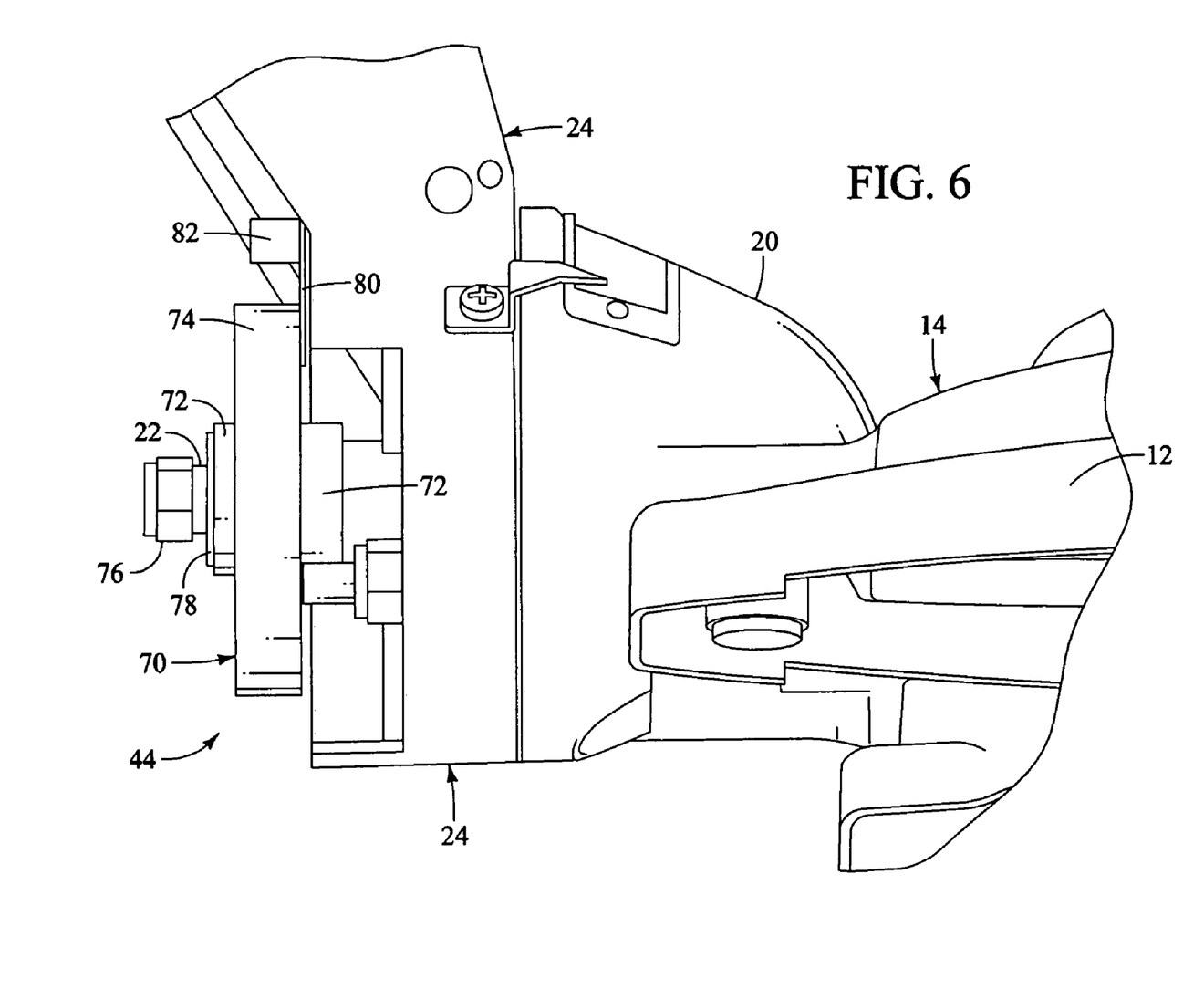
FIG. 6 is a side view of a portion of the embodiment shown in FIG. 1 and illustrating the bevel angle sensor structure.
Figure 7:
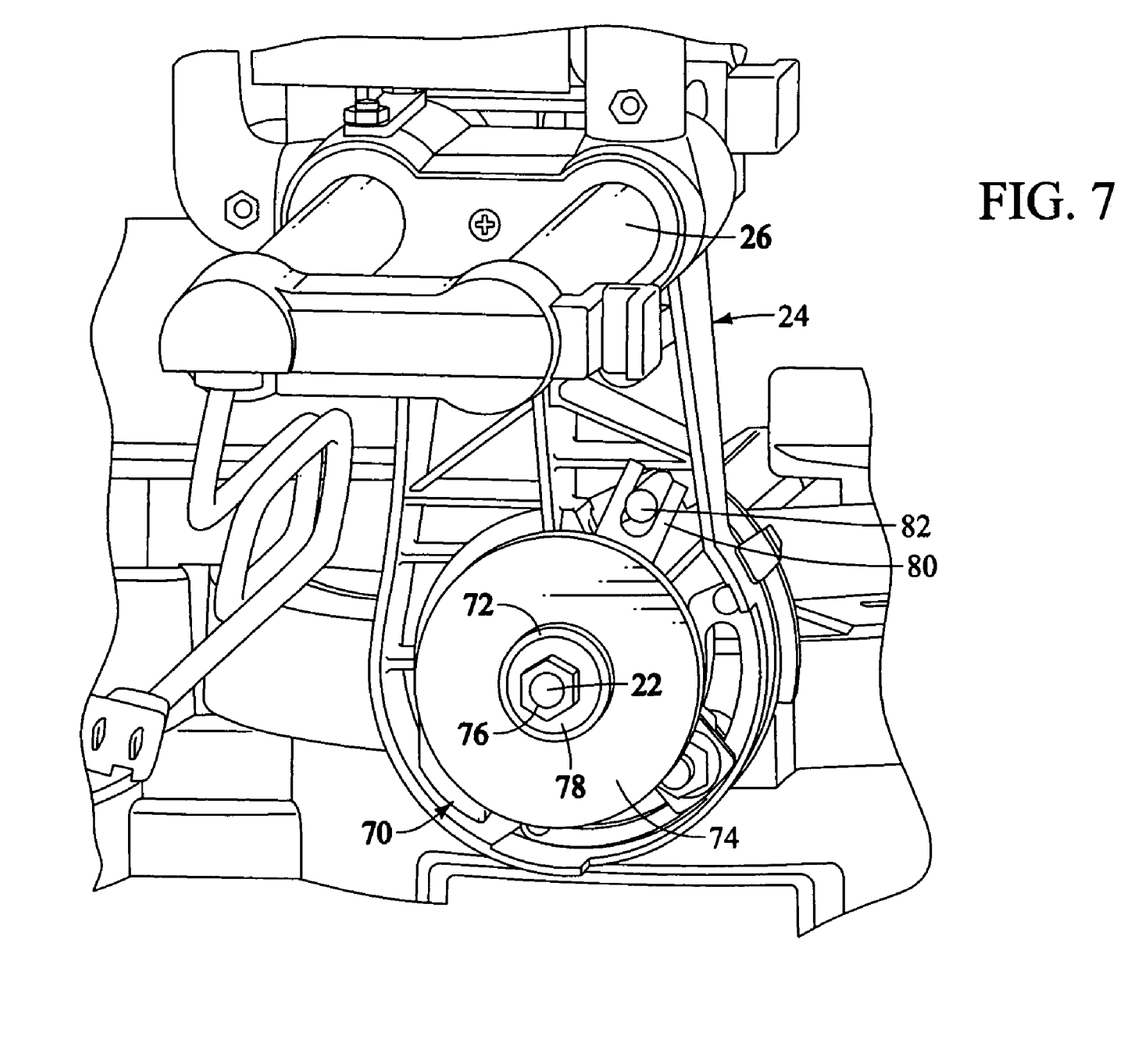
FIG. 7 is a rear view of the embodiment shown in FIG. 1, particularly illustrating the bevel pivot support housing and the bevel angle transducer structure.
Figure 8:
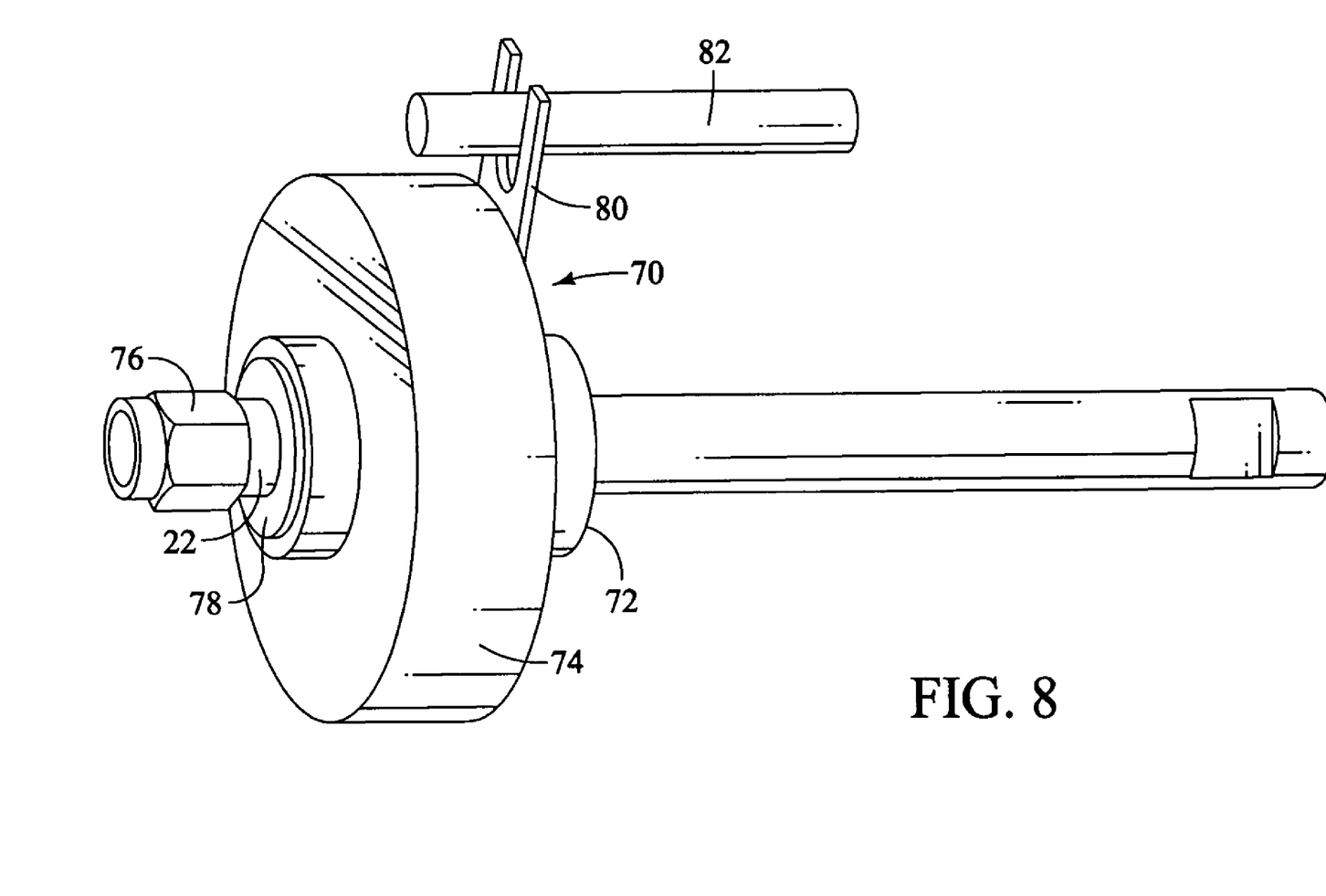
FIG. 8 is an enlarged perspective side view illustrating the main components of the bevel angle sensor structure of the embodiment shown in FIG. 1.

With regard to the bevel angle sensing structure 44 and referring to FIGS. 2, 6 and 8, it comprises a bevel angular position transducer 70 that includes an inner hollow cylinder 72 and a cylindrical housing 74 that is rotatable relative to the inner hollow cylinder and the shaft. The bevel angular position transducer 70 generates signals indicating the angular position of the two cylinders relative to one another, and is mounted on the threaded shaft 22 and is held by an end nut 76 threaded onto the threaded shaft 22. A keyed washer 78 is also provided between the inner hollow cylinder 72 and the nut 76. The keyed washer 78 and shaft 22 has substantially the same configuration as the keyed washer 60 shown in FIGS. 2-5 and performs the same function of preventing any rotational force being applied to the hollow cylinder 72 as a result of rotating the nut 76 to tighten the connection between the bevel pivot support housing 24 and the bevel base portion 20 of the table 14. In this sensing unit, the hollow cylinder 72 is held in place relative to the shaft 22 in a similar manner as the outer cylinder 56 is operatively connected to the vertical shaft 16. Thus, an O-ring (FIG. 9), spline (FIGS. 11-13) or tolerance ring (FIG. 10) is used to prohibit relative rotational movement between the hollow cylinder 72 and the shaft 22, while permitting limited axial movement that may be necessary when the nut 76 is tightened on the shaft 22 for the purpose of increasing the amount of friction that exists during rotation of the bevel pivot support housing 24 and the bevel base portion 20.

The cylindrical housing 74 is operatively connected to the bevel pivot support housing 24 which causes the cylindrical housing 74 to move in unison with the bevel pivot support housing 24. This is achieved by a bracket 80 that is similar to the bracket 64 on the miter sensing unit structure. In this regard, it has a forked end portion that contacts both sides of a pin 82 that is secured to the bevel base portion 20 of the table. By virtue of the sliding relationship of the bracket 80 and the pin 82, limited axial movement of the bevel angular position transducer 70 is permitted as may result from tightening of the nut 78 on the shaft 22.

The bevel angular position transducer 70 generates signals that are fed to the display 68 by connectors and conductors, not shown, and the display 68 may be located on the saw 10 at a convenient location that is visible to a user as previously described. As previously described for the display 68, if the display of the bevel sensing structure 44 is separate from the display of the miter sensing structure 42, it would similarly have processing means incorporated into its design so that the position signals from the bevel sensing structure 44 can be converted to a digital display for viewing by an operator.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A power miter saw comprising:
   a saw base having a fence for positioning a work piece;
   a table rotatably connected to said saw base about a vertical shaft, said shaft having at least a threaded end portion and a nut threaded on said end portion for holding said table and said saw base together, the amount of resistance to rotation of said table relative to said saw base being controlled by the tightness of said nut;
   a handle assembly for angularly positioning said table relative to said saw base;
   a saw blade and motor assembly operatively connected to said table and being pivotable about a horizontal axis to move a saw blade into and out of cutting position;
   a miter sensing unit operatively connected to said saw base and said table for determining the angular position of said table relative to said saw base and generating position signals indicative thereof;

a display unit operatively connected to said sensing unit for receiving said position signals and providing a digital display of said determined angular position;

wherein said vertical shaft is non-rotationally attached to said table and extends through an opening in said saw base, said miter sensing unit being located on said shaft between said saw base and said nut; and wherein said sensing unit comprises a first element surrounding said vertical shaft and being rotationally fixed to, and axially movable relative to said vertical shaft, and a second element surrounding said first element, said second element being rotationally fixed to, and axially movable relative to the saw base, such that the sensing unit does not interfere with access to said nut, there being a thrust surface between said first element and said saw base to facilitate easy rotation between said first element and said saw base in the presence of axial force being applied by said nut.

2. A miter saw as defined in claim 1 wherein said horizontal axis is perpendicular to the plane of said saw blade.

3. A miter saw as defined in claim 1 wherein said miter sensing unit comprises an angular position transducer and said first element is an outer cylindrical housing and said second element is an inner hollow cylinder that are rotatable relative to one another, said transducer generating signals that are indicative of the angular position of said cylindrical housing relative to said hollow cylinder, said hollow cylinder being mounted on said vertical shaft and said cylindrical housing being connected to said saw base, said transducer thereby generating signals indicative of the angular position of said table relative to said saw base.

4. A miter saw as defined in claim 3 wherein said angular position transducer comprises one selected from the group consisting of a single turn potentiometer, a multiple turn potentiometer, a string potentiometer and an optical encoder.

5. A miter saw as defined in claim 3 wherein said cylindrical base is configured to move in the axial direction with said hollow cylinder, responsive to rotation of said nut.

6. A miter saw as defined in claim 3 wherein said hollow cylinder is mounted on said vertical shaft in a manner than permits limited axial movement along said shaft, but is not rotatable relative thereto.

7. A miter saw as defined in claim 6 further comprising a rubber O-ring located between said hollow cylinder and said vertical shaft.

8. A miter saw as defined in claim 6 further comprising a tolerance ring located between said hollow cylinder and said vertical shaft.

9. A miter saw as defined in claim 6 wherein one of said hollow cylinder and said vertical shaft has an axial recess and the other has a complementary shaped spline or key which permit axial movement of said hollow cylinder relative to said vertical shaft.

10. A miter saw as defined in claim 3 wherein said outer cylindrical housing is operatively connected to said saw base to prevent rotation thereof while permitting limited axial movement thereof.

11. A miter saw as defined in claim 10 further comprising an outwardly extending bracket arm connected to said cylindrical housing and contacting an anti-rotation pin that is connected to said saw base and is oriented parallel to the axis of said cylindrical housing.

12. A miter saw as defined in claim 1 further comprising a washer located on said vertical shaft between said hollow cylinder and said nut, said washer being operatively connected to said shaft to prevent rotation relative to said shaft.

13. A miter saw as defined in claim 12 wherein said shaft has an axial groove and said washer is a keyed washer having a tang that fits within said groove.

14. A miter saw as defined in claim 1 further comprising a processing means for receiving said position signals and generating display signals for said display unit.

15. A miter saw as defined in claim 14 wherein said processing means is integrated in said display unit.

16. A miter saw as defined in claim 1 wherein said saw blade and motor assembly further comprises:

a bevel base portion connected to said table, said base portion having a bevel pivot shaft that is horizontally oriented and generally aligned with said blade;

a bevel pivot support housing operatively connected to said bevel base portion and pivotal about said pivot shaft, said shaft having at least a threaded end portion and a nut threaded on said end portion for holding said bevel pivot support housing and said bevel base portion together, the amount of resistance to rotation of said bevel pivot support housing relative to said bevel base portion being controlled by the tightness of said nut;

a bevel sensing unit operatively connected to said bevel pivot support housing and said bevel base portion for determining the angular position of said bevel pivot support housing relative to said bevel base portion and generating bevel position signals indicative thereof; and, a second display unit operatively connected to said bevel sensing unit for receiving said position signals and providing a digital display of said determined angular position;

wherein said bevel sensing unit is positioned adjacent said shaft and does not interfere with access to said nut.

17. A miter saw as defined in claim 16 wherein said horizontal shaft is non-rotationally attached to said bevel base portion and extends through an opening in said bevel pivot support housing, said bevel sensing unit being located on said shaft between said bevel pivot support housing and said nut.

18. A miter saw as defined in claim 17 wherein said bevel sensing unit comprises a bevel annular position transducer having an outer cylindrical housing and an inner hollow cylinder that are rotatable relative to one another, said bevel sensing unit generating signals that are indicative of the angular position of said cylindrical housing relative to said hollow cylinder, said hollow cylinder being mounted on said horizontal shaft and said cylindrical housing being connected to said bevel pivot support housing, said bevel angular position transducer thereby generating signals indicative of the angular position of said bevel pivot support housing relative to said bevel base portion.

19. A miter saw as defined in claim 18 wherein said inner hollow cylinder is located on the outside end portion of said shaft and having its inside end surface in contact with said bevel pivot support housing.

20. A miter saw as defined in claim 19 further comprising a washer located on said bevel pivot shaft between said hollow cylinder and said nut, said washer being operatively connected to said shaft to prevent rotation relative to said shaft.

21. A miter saw as defined in claim 18 wherein said cylindrical housing is configured to move in the axial direction with said hollow cylinder, responsive to rotation of said nut.

22. A miter saw as defined in claim 18 wherein said cylindrical housing is configured to move in the axial direction with said hollow cylinder, responsive to rotation of said nut.

23. A miter saw as defined in claim 18 wherein said bevel angular position transducer comprises a shaft encoder selected from the group consisting of a single turn potentiometer, a multiple turn potentiometer, a string potentiometer and an optical encoder.

24. A miter saw as defined in claim 18 wherein said hollow cylinder is mounted on said bevel pivot shaft in a manner than permits limited axial movement along said shaft, but is not rotatable relative thereto.

25. A miter saw as defined in claim 24 further comprising a rubber O-ring located between said hollow cylinder and said bevel pivot shaft.

26. A miter saw as defined in claim 24 further comprising a tolerance ring located between said hollow cylinder and said bevel pivot shaft.

27. A miter saw as defined in claim 24 wherein one of said hollow cylinder and said bevel pivot shaft has an axial recess and the other has a complementary shaped spline or key which permit axial movement of said hollow cylinder relative to said bevel pivot shaft.

\* \* \* \* \*